(12) United States Patent
Jones et al.

(10) Patent No.: US 8,276,308 B1
(45) Date of Patent: Oct. 2, 2012

(54) SEMIAUTONOMOUS WATERFOWL DECOY SYSTEM

(75) Inventors: Jayce E. Jones, Benton, AR (US); Janes M. Kuhlmann, Benton, AR (US)

(73) Assignee: Jayce Jones, Benton, AR (US)

( * ) Notice: Subject to any disclaimer, the term of this patent is extended or adjusted under 35 U.S.C. 154(b) by 0 days.

(21) Appl. No.: 13/403,676

(22) Filed: Feb. 23, 2012

Related U.S. Application Data

(62) Division of application No. 12/716,709, filed on Mar. 3, 2010, now Pat. No. 8,146,285.

(60) Provisional application No. 61/209,459, filed on Mar. 9, 2009.

(51) Int. Cl.
*A01M 31/06* (2006.01)

(52) U.S. Cl. .................................. 43/3; 43/2

(58) Field of Classification Search ............... 43/3, 2
See application file for complete search history.

(56) References Cited

U.S. PATENT DOCUMENTS

| | | | | | |
|---|---|---|---|---|---|
| 2,835,064 | A | * | 5/1958 | Webb | 43/3 |
| 3,074,195 | A | * | 1/1963 | Vanderpool | 43/3 |
| 3,689,927 | A | * | 9/1972 | Boston et al. | 43/3 |
| 4,322,908 | A | * | 4/1982 | McCrory | 43/3 |
| 4,422,257 | A | * | 12/1983 | McCrory | 43/3 |
| 4,535,560 | A | * | 8/1985 | O'Neil | 43/3 |
| 4,612,722 | A | * | 9/1986 | Ferrell | 43/3 |
| 4,910,905 | A | * | 3/1990 | Girdley et al. | 43/3 |
| 5,377,439 | A | * | 1/1995 | Roos et al. | 43/3 |
| 5,775,022 | A | * | 7/1998 | Sumrall et al. | 43/3 |
| 6,079,140 | A | * | 6/2000 | Brock, IV | 43/3 |
| 6,138,396 | A | * | 10/2000 | Capps | 43/3 |
| 6,321,480 | B1 | * | 11/2001 | Solomon | 43/3 |
| 6,339,894 | B1 | * | 1/2002 | Solomon | 43/3 |
| 6,463,690 | B1 | * | 10/2002 | Wood et al. | 43/3 |
| 6,553,709 | B1 | * | 4/2003 | Owen | 43/3 |
| 6,601,333 | B2 | * | 8/2003 | Cicoff et al. | 43/3 |
| 6,655,070 | B2 | * | 12/2003 | Wood | 43/2 |
| 6,845,586 | B1 | * | 1/2005 | Brock, IV | 43/3 |
| 7,472,508 | B2 | * | 1/2009 | Myers, IV | 43/3 |
| 7,941,963 | B2 | * | 5/2011 | Myers, IV | 43/3 |
| 7,958,666 | B2 | * | 6/2011 | Rogers | 43/3 |
| 7,963,064 | B2 | * | 6/2011 | Smith | 43/3 |
| 7,975,421 | B2 | * | 7/2011 | Ware et al. | 43/3 |
| 7,975,422 | B2 | * | 7/2011 | Elliott et al. | 43/3 |
| 8,051,598 | B2 | * | 11/2011 | Stillwell | 43/2 |
| 8,146,285 | B1 | * | 4/2012 | Jones et al. | 43/3 |
| 2009/0188148 | A1 | * | 7/2009 | Orris et al. | 43/3 |
| 2011/0067289 | A1 | * | 3/2011 | Lane | 43/3 |
| 2011/0094143 | A1 | * | 4/2011 | Ware et al. | 43/3 |

OTHER PUBLICATIONS

Parent case—U.S. Appl. No. 12/716,709, filed Mar. 3, 2010, entitled: Semi-Autonomous Waterfowl Decoy System, currently allowed, to Jayce E. Jones, et al.

* cited by examiner

*Primary Examiner* — Darren W Ark (57) ABSTRACT

A waterfowl decoy comprising a waterfowl decoy body, a propulsion system, an accelerometer, and a microcontroller. In a preferred embodiment, the waterfowl decoy body has an inner cavity with an equipment mounting surface therein with the propulsion system coupled to the equipment mounting surface and configured to propel the waterfowl decoy across a surface of water. The accelerometer is coupled to the equipment mounting surface and configured to sense accelerations of the waterfowl decoy body when propelled across the surface of water, and the microcontroller is coupled to the accelerometer and configured to calculate a distance traveled by the waterfowl decoy body when propelled across the surface of water. A waterfowl decoy system and a method of manufacturing a waterfowl decoy system are also provided.

22 Claims, 11 Drawing Sheets

SEMIAUTONOMOUS WATERFOWL DECOY SYSTEM

CROSS-REFERENCE TO RELATED APPLICATIONS

This Application claims the benefit of U.S. Provisional Application Ser. No. 61/209,459 filed on Mar. 9, 2009, entitled: SUPER SWIMMERS DECOY SYSTEM, commonly owned with the present invention and incorporated herein by reference. This Application is a Divisional Application of and further claims the benefit of prior application Ser. No. 12/716,709 filed on Mar. 3, 2010, entitled: SEMI-AUTONOMOUS WATERFOWL DECOY SYSTEM, currently allowed, to Jayce E. Jones, et al. The above-listed Application is commonly assigned with the present invention and is incorporated herein by reference as if reproduced herein in its entirety.

TECHNICAL FIELD OF THE INVENTION

The present invention is directed, in general to a hunter's waterfowl decoy system and more specifically, to a semi-autonomous waterfowl decoy system.

BACKGROUND OF THE INVENTION

Decoys of great variety in construction and purpose are available to be employed as lures for hunting and to a lesser extent to attract wild animals for animal observation and/or to retrieve biological or other samples for further study. For example, wild birds, fish and other animals are often captured, e.g., through anesthesia, and banded, provided with radio emitting tags or otherwise distinguished from the flock, school or herd for the purpose of later tracking or identification. More frequently, decoys are employed during hunting season to emulate a waterfowl or a group of waterfowl at a location suitable for example, for feeding, in order to lure migratory waterfowl to within suitable shooting range and subsequent recovery of downed waterfowl carcasses.

While decoys often provide a life-like appearance, it is also desirable to have the decoy move in the water such that it emulates the swimming motion of a duck, or other waterfowl, in a life-like fashion. Many attempts have been made to so motivate decoys. However, the resulting decoys are often designed such that they will tend to exhibit fixed or regular swimming, feeding or diving motion, unlike the actual random motion of, for example, a duck.

Some previous decoys have employed an apparatus for causing the decoy to repeatedly traverse a fixed tether or string. Hence, the decoy traverses back and forth along the tether string in a fashion which is atypical of the motion of a wild duck. Other decoys use manually preset rudders which cause the decoy to traverse a set circular path on the water surface. Of course, this is unlike the random motion of real ducks.

In order to provide more lifelike swimming motions, some previous decoys have used radio-control technology to direct the decoy motion and operate specific subsystems simulating such actions as feeding, anchoring and game retrieval. Each decoy is controlled individually from a dedicated transmitter, requiring the full concentration of one hunter to the exclusion of searching for inbound live game. However, a large number of decoys are typically used during a hunt. Using anywhere from one dozen to ten dozen decoys is not uncommon when duck hunting. The number of decoys used is typically even greater, sometimes over twenty dozen, when hunting for geese. Therefore, radio controlled technology, regardless of the opportunity to control a variety of motions, is generally contraindicated for migratory waterfowl hunting.

Accordingly, what is needed in the art is a decoy or decoy system that does not suffer from the deficiencies of the prior art.

SUMMARY OF THE INVENTION

To address the above-discussed deficiencies of the prior art, the present invention provides a waterfowl decoy comprising a waterfowl decoy body, a propulsion system, an accelerometer, and a microcontroller. In a preferred embodiment, the waterfowl decoy body has an inner cavity with an equipment mounting surface therein with the propulsion system coupled to the equipment mounting surface and configured to propel the waterfowl decoy across a surface of water. The accelerometer is coupled to the equipment mounting surface and configured to sense accelerations of the waterfowl decoy body when propelled across the surface of water, and the microcontroller is coupled to the accelerometer and configured to calculate a distance traveled by the waterfowl decoy body when propelled across the surface of water.

In an alternative embodiment, a waterfowl decoy system comprises a base pole, a waterfowl decoy body, a propulsion system, an accelerometer, a decoy microcontroller, and a first receiver. The base pole has a transmitter configured to send a radio frequency signal while the waterfowl decoy body has an inner cavity with an equipment mounting surface therein. The propulsion system is coupled to the equipment mounting surface and configured to propel the waterfowl decoy across a surface of water. The accelerometer is coupled to the equipment mounting surface and configured to sense accelerations of the waterfowl decoy body when propelled across the surface of water. The decoy microcontroller is coupled to the accelerometer and configured to calculate a distance traveled by the waterfowl decoy body when propelled across the surface of water. Furthermore, the first receiver is coupled to the equipment mounting surface and the microcontroller, whereas the first receiver communicates the range setting to the decoy microcontroller.

Also provided is a method of manufacturing a waterfowl decoy system comprising coupling a transmitter to a base pole, configuring the transmitter to send a radio frequency signal, providing a waterfowl decoy body having an inner cavity with an equipment mounting surface therein, coupling a propulsion system to the equipment mounting surface and configuring the propulsion system to propel the waterfowl decoy across a surface of water. The method also includes coupling an accelerometer to the equipment mounting surface and configuring the accelerometer to sense accelerations of the waterfowl decoy body when propelled across the surface of water, coupling a decoy microcontroller to the accelerometer and configuring the decoy microcontroller to calculate a distance traveled by the waterfowl decoy body when propelled across the surface of water, and coupling a first receiver to the equipment mounting surface and the microcontroller and configuring the first receiver to communicate the range setting to the decoy microcontroller.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
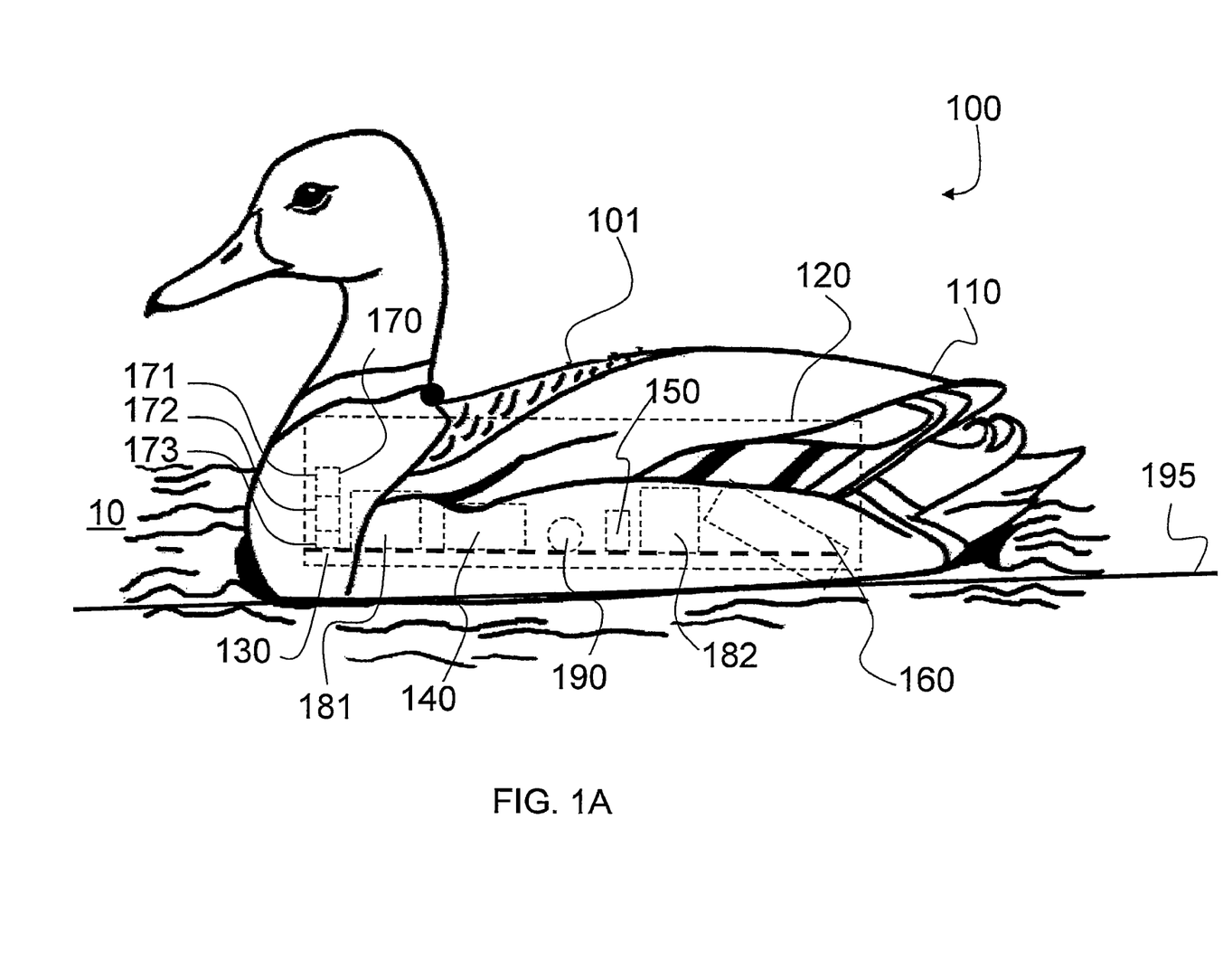
FIGS. 1A and 1B illustrate an elevation view and a block diagram, respectively, of one embodiment of an autonomous waterfowl decoy constructed according to the principles of the present invention.
Figure 1B:
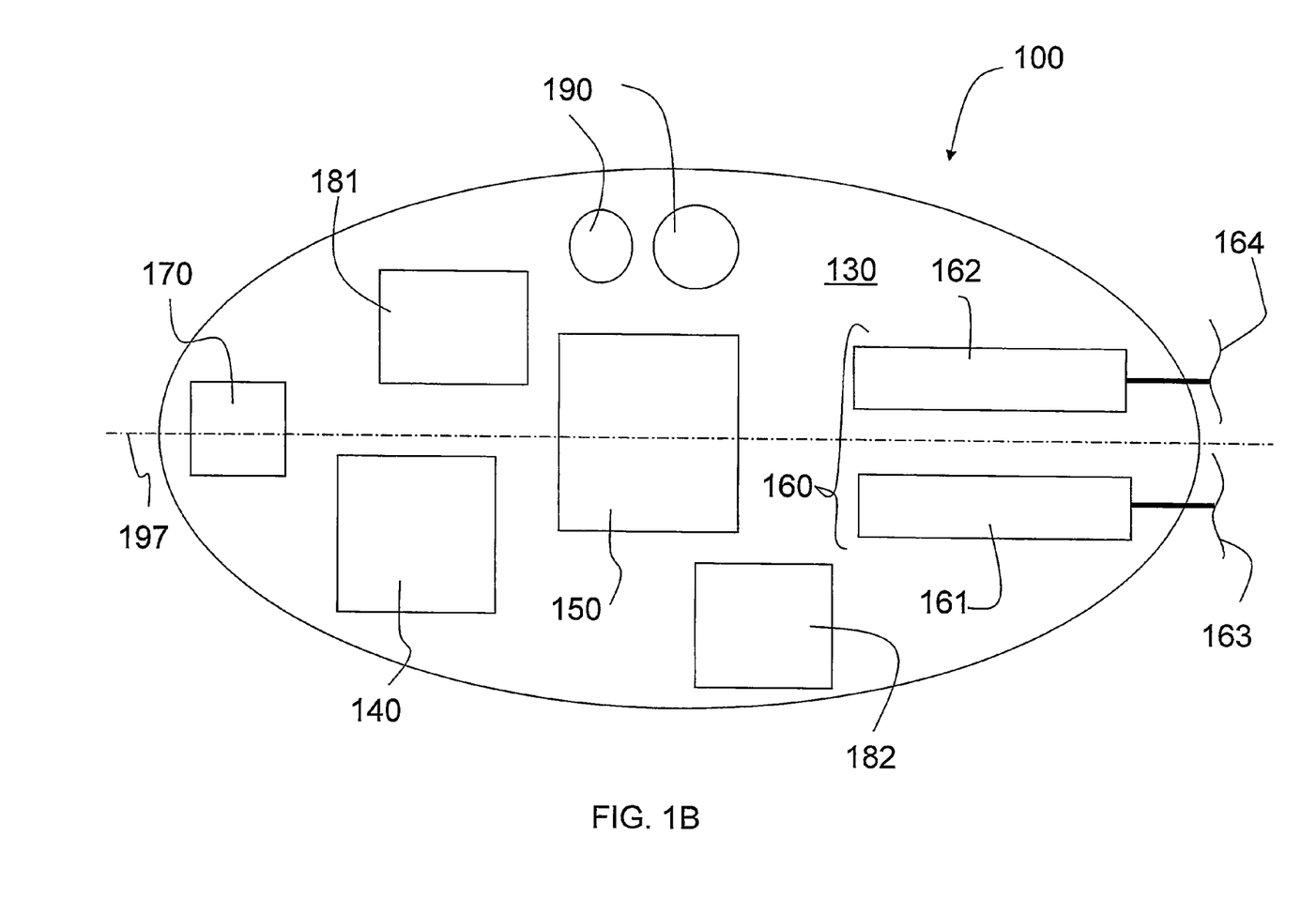

Referring initially to FIGS. 1A and 1B, illustrated are an elevation view and a block diagram, respectively, of one embodiment of an autonomous waterfowl decoy 100 constructed according to the principles of the present invention. The waterfowl decoy 100 comprises a decoy body 110, an inner cavity 120 having an equipment mounting surface 130 located therein, a microcontroller 140, a dual axis accelerometer 150, a propulsion system 160, a multi-position range control switch 170, first and second rechargeable battery packs 181, 182, respectively, and a power receptacle 190. Access to the inner cavity 120 is achieved by lifting a hinged back 101 of the decoy body 110. The microcontroller 140, dual axis accelerometer 150, part of the propulsion system 160, the multi-position range control switch 170, the first and second rechargeable battery packs 181, 182, respectively, and the power receptacle 190 are mounted on the equipment mounting surface 130 above a waterline 195 that the decoy 100 will encounter.

The waterfowl decoy 100 must be constructed in such a way and of such a material that the decoy 100 floats on a water surface at a height, i.e., waterline 195, similar to that of the waterfowl species, e.g., duck, goose, etc., that the decoy 100 simulates. One who is of skill in the art is familiar with materials, e.g., plastic, fiberglass, etc., and floatation means, e.g., closed cell rigid plastic foam, by which proper floatation may be achieved. Ballast may be added as necessary to assure stability of the decoy 100 when on the water 10.

Figure 3A:
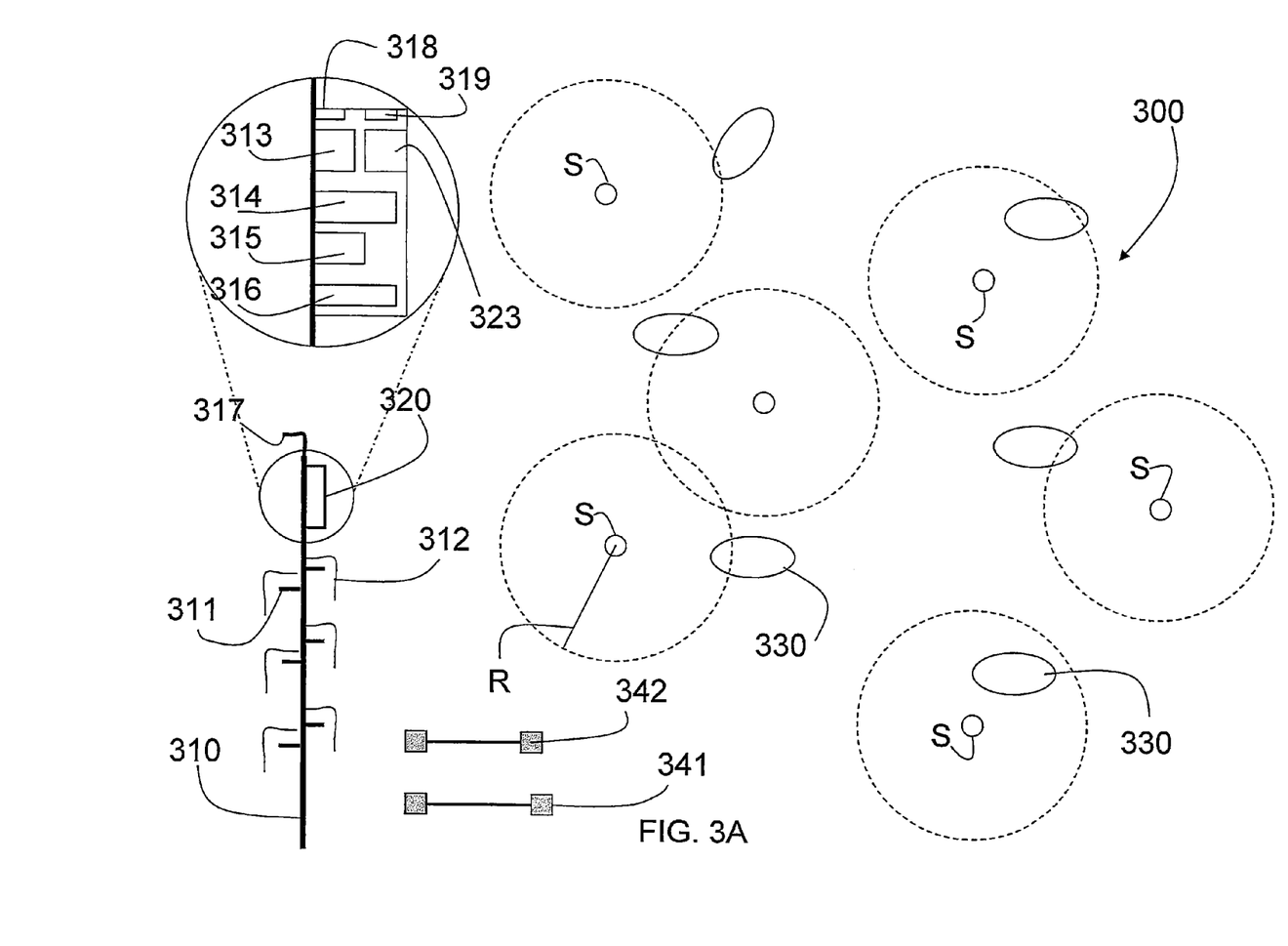
FIG. 3 illustrates an elevation view of a second embodiment of an autonomous waterfowl decoy system.

The waterfowl decoy 100 is constructed so as to autonomously "swim" on the water surface 10 within a preset range (radius) R of a starting point S (FIG. 3A). The preset range R is selected by selecting one of the multi-positions of the range control switch 170. For example, the multi-position range control switch 170 may have three positions 171-173 corresponding to radii of 15', 30', and 45' of the starting point S. Of course, these distances are merely representative and other distances may be used. The decoy 100 achieves this autonomy through operation of an algorithm (to be described below) loaded into the microcontroller 140 limited by the range R selected with the multi-position range control switch 170. The microcontroller 140 is powered by the first rechargeable battery pack 181 mounted on the equipment mounting surface 130.

In a preferred embodiment, the propulsion system 160 comprises left and right conventional DC electric motors 161, 162 mounted on the equipment mounting surface 130 and coupled to left and right propellers 163, 164 that project below the water surface 10 and are offset on either side of a centerline 197 of the decoy 100. The left and right electric motors 161, 162 and thus the left and right propellers 163, 164 are powered by the second rechargeable battery pack 182 that is also mounted on the equipment mounting surface 130. The second rechargeable battery pack 182 may be a 6V DC battery pack of lithium or lithium-ion battery cells. Of course, other battery types may also be used to increase battery life and decrease the size or weight of the battery pack. The left and right electric motors 161, 162 and thus the left and right propellers 163, 164 may be independently powered as directed by the microcontroller 140. Furthermore, the speed of rotation of the left and right motors 161, 162 and, therefore, the rotational speed of the left and right propellers 163, 164 may be controlled by the DC voltage applied to the left and right motors 161, 162 as controlled through an h-bridge integrated circuit, e.g., SN754410 a product of Texas Instruments Inc. of Dallas, Tex., by use of a pulse width modulation (PWM) signal from the microcontroller 140. Likewise, DC voltage applied to the left and right electric motors 161, 162 may be reversed so as to drive the left and right propellers 163, 164 in a reverse direction, as necessary. Thus, by running the right electric motor 162 in forward and the left electric motor 161 in reverse, a much tighter turn to the left of the decoy 100 should be achieved than by simply running the right electric motor 162 at full speed in forward. The first and second rechargeable battery packs 181, 182 are recharged by power supplied through the power receptacle 190. In one embodiment, the power receptacle 190 may comprise both AC and DC power receptacles. Appropriate circuitry to rectify the AC power or to step down the DC voltage as needed for the first and second rechargeable battery packs 181, 182 is provided. In one embodiment, the left and right electric motors 161, 162 may require 6 VDC and the microcontroller 140 may require 5 VDC. One who is of skill in the art is familiar with the circuitry necessary to provide the appropriate charging voltage.

The dual axis accelerometer 150 may be a Memsic 2125 Dual Axis accelerometer. The Memsic 2125 accelerometer is a low cost, thermal accelerometer capable of measuring tilt, collision, static and dynamic acceleration, rotation, and vibration with a range of ±3 G's on two axes. The Memsic 2125 is provided on a small printed circuit board providing all I/O connections for easy incorporation into the decoy 100. The Memsic 2125 Dual Axis Accelerometer is available from Parallax Inc. of Rocklin, Calif. Each axis output of the dual axis accelerometer 150 is in the form of a 100 Hz PWM duty cycle in which acceleration is proportional to the ratio tHx/Tx where tHx is the width of the high voltage curve and Tx is the width of one full cycle. In practice, it has been found that Tx is consistent so reliable results can be achieved by measuring only the duration of tHx.

In one embodiment, the microcontroller 140 is an Arduino Duemilanove USB Microcontroller Module by Spark Fun Electronics of Boulder, Colo. A dead reckoning program is used to determine the distance traveled by the waterfowl decoy 100 with inputs of dual axis acceleration from the Memsic 2125 Dual Axis accelerometer. One who is of skill in the art is familiar with computation of dead reckoning distance when time and acceleration are known.

Figure 2A:
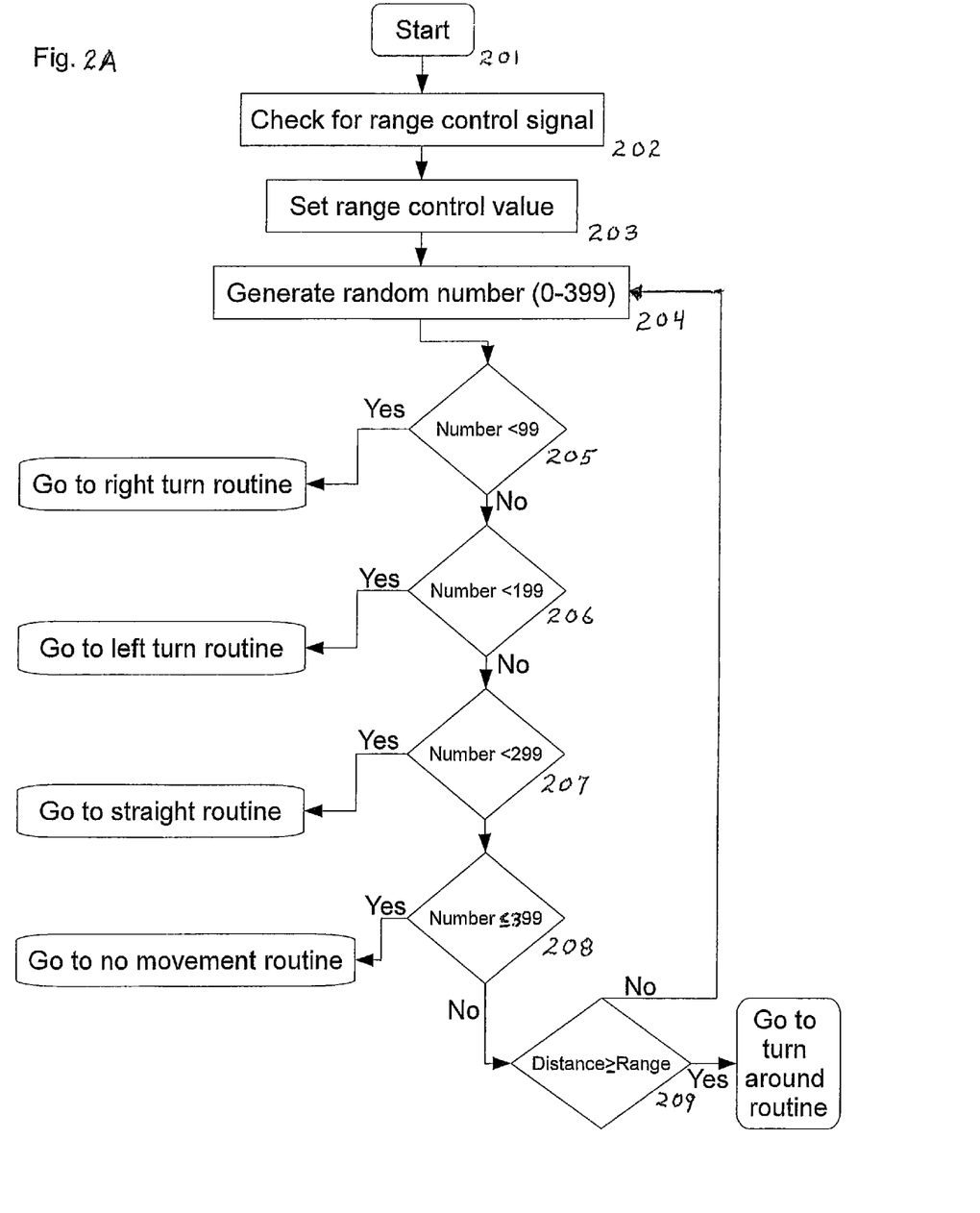
FIGS. 2A-2F illustrate flow charts of the main program algorithm and subroutines that define the program logic employed to control the waterfowl decoy.

Referring now to FIG. 2A, illustrated is a flow chart of one embodiment of the overall program logic employed to control the waterfowl decoy 100. Beginning at Start Step 201, at the next Step 202 the algorithm checks for the range control setting R (See FIG. 3A) of the multi-position range control switch 170. The switch setting sets the range control value R in the algorithm at Step 203. At this point, distance traveled by the decoy is zero. The algorithm then generates a random number between 0 and 399 at Step 204. At Step 205, the random number is checked for a value less than 99. If the random number is less than 99, the algorithm branches to the right turn routine. If the random number is not less than 99, the algorithm advances to Step 206 and checks for a value less than 199.

If the random number is less than 199, the algorithm branches to the left turn routine. If the random number is not less than 199, the algorithm advances to Step 207 and checks for a value less than 299. If the random number is less than 299, the algorithm branches to the straight movement routine. If the random number is not less than 299, the algorithm advances to Step 208 and checks for a value less than or equal to 399. If the random number is less than or equal to 399, the algorithm branches to the no movement routine. If the random number is not less than or equal to 399, the algorithm advances to Step 209 and checks for a distance value greater than or equal to the range control setting R. If the distance value is not greater than or equal to the range control setting R, the algorithm branches back to Start at Step 201. If the distance value is greater than or equal to the range control setting R, the algorithm branches to the turn around routine.

Figure 2B:
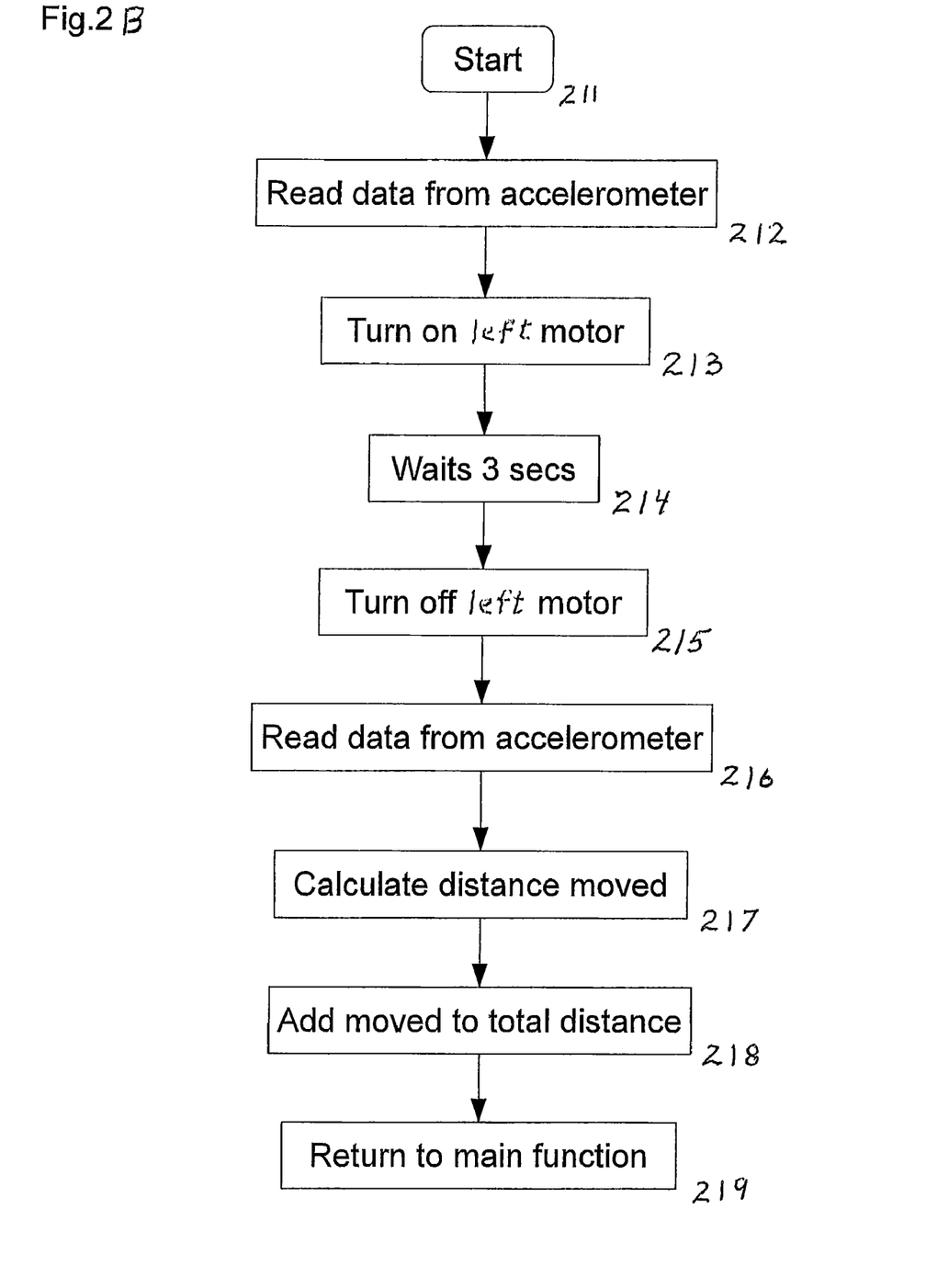

As specified above, if the random number is less than 99, the algorithm branches to the right turn routine. Referring now to FIG. 2B, illustrated is a flow chart of one embodiment of the right turn function logic employed to control the waterfowl decoy 100. Beginning at Start Step 211, the algorithm reads X and Y acceleration data from the accelerometer 150 at Step 212. At Step 213, the algorithm directs the microcontroller to turn ON the left motor 161 to create a right turn. At Step 214, the algorithm continues with the left motor running for 3 seconds. At Step 215, the algorithm directs the microcontroller to turn the left motor 161 OFF. At Step 216, the algorithm directs the microcontroller to read the X and Y acceleration data from the accelerometer 150. At Step 217, the algorithm calculates the distance moved according to the dead reckoning equation. At Step 218, the algorithm adds the distance moved to the then total distance. At Step 219, the algorithm returns to the Main Program at Step 204 and proceeds as above.

Figure 2C:
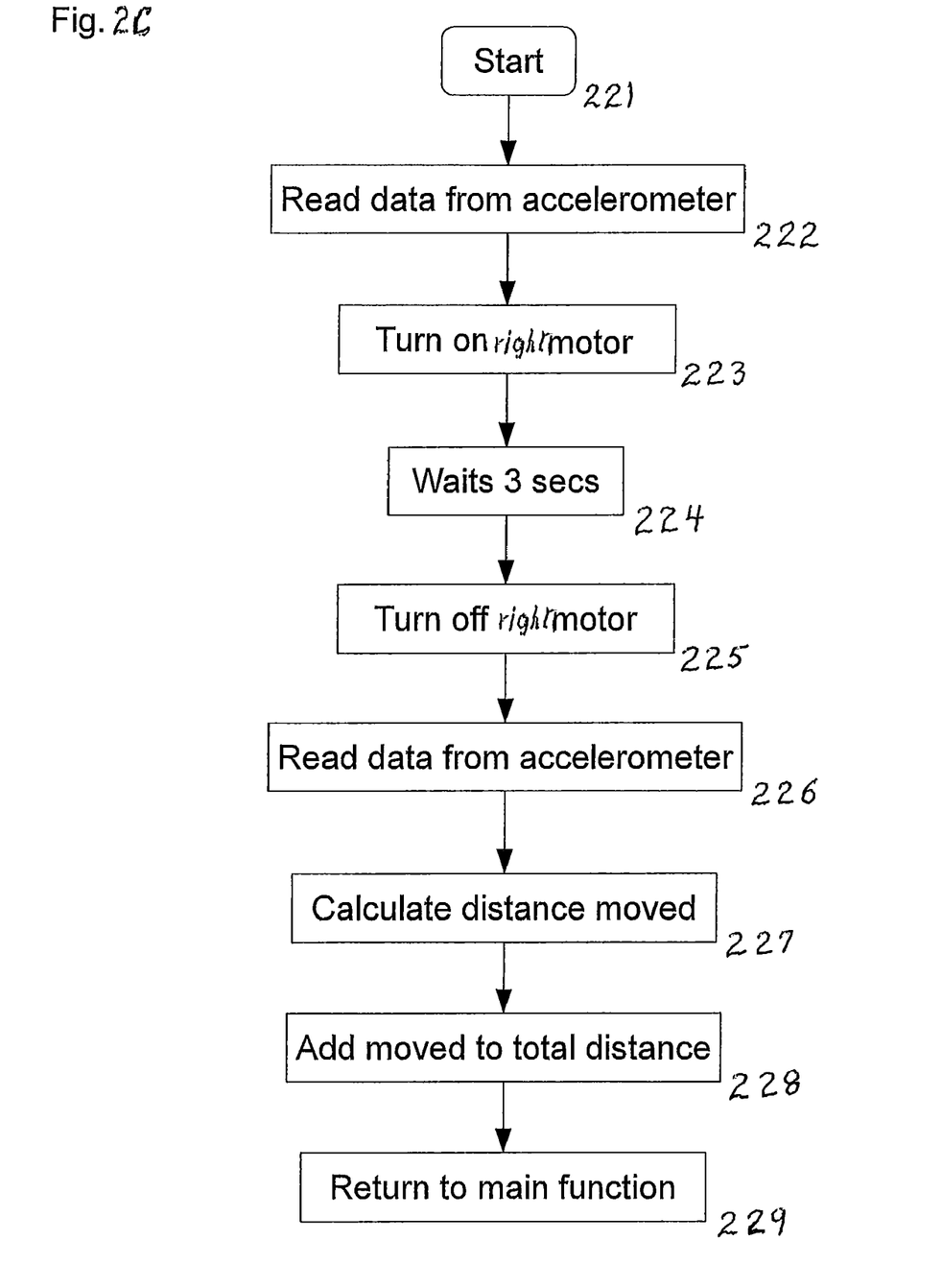

As explained above, if the random number is less than 199, the algorithm branches to the left turn routine. Referring now to FIG. 2C, illustrated is a flow chart of one embodiment of the left turn function logic employed to control the waterfowl decoy 100. Beginning at Start Step 221, the algorithm reads X and Y acceleration data from the accelerometer 150 at Step 222. At Step 223, the algorithm directs the microcontroller 140 to turn ON the right motor 162 to create a left turn. At Step 224, the algorithm continues with the right motor 162 running for 3 seconds. At Step 225, the algorithm directs the microcontroller to turn the right motor 162 OFF. At Step 226, the algorithm directs the microcontroller 140 to read the X and Y acceleration data from the accelerometer. At Step 227, the algorithm calculates the distance moved according to the dead reckoning equation. At Step 228, the algorithm adds the distance moved to the then total distance. At Step 229, the algorithm returns to the Main Program at Step 204 and proceeds as above.

Figure 2D:
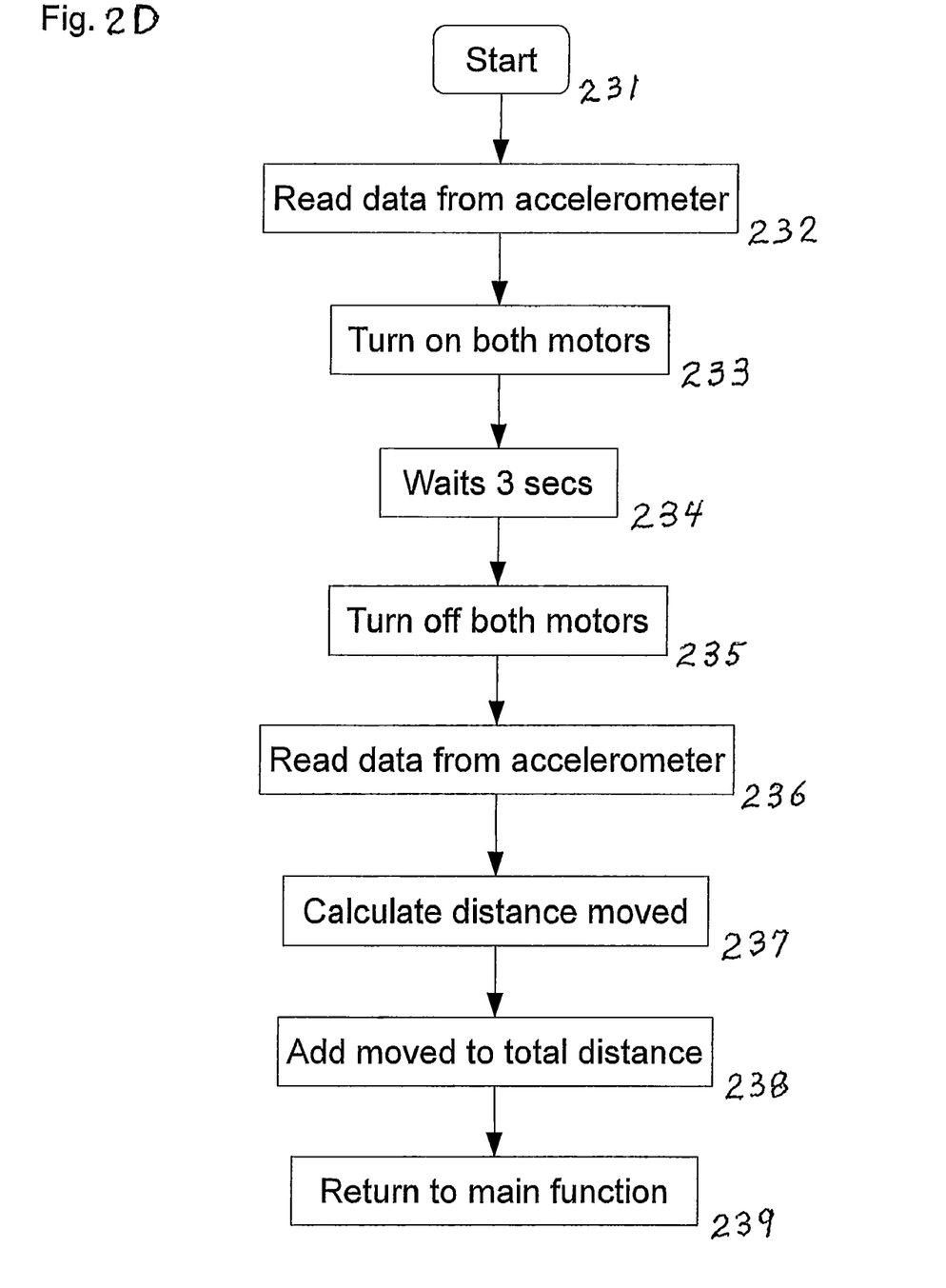

As specified above, if the random number is less than 299, the algorithm branches to the straight movement routine. Referring now to FIG. 2D, illustrated is a flow chart of one embodiment of the straight movement function logic employed to control the waterfowl decoy 100. Beginning at Start Step 231, the algorithm reads X and Y acceleration data from the accelerometer 150 at Step 232. At Step 233, the algorithm directs the microcontroller to turn both right and left motors 161, 162 ON. At Step 234, the algorithm continues with both right and left motors 161, 162 running for 3 seconds. At Step 235, the algorithm directs the microcontroller to turn both right and left motors 161, 162 OFF. At Step 236, the algorithm directs the microcontroller to read the X and Y acceleration data from the accelerometer. At Step 237, the algorithm calculates the distance moved according to the dead reckoning equation. At Step 238, the algorithm adds the distance moved to the then total distance. At Step 239, the algorithm returns to the Main Program at Step 204 and proceeds as above.

Figure 2E:
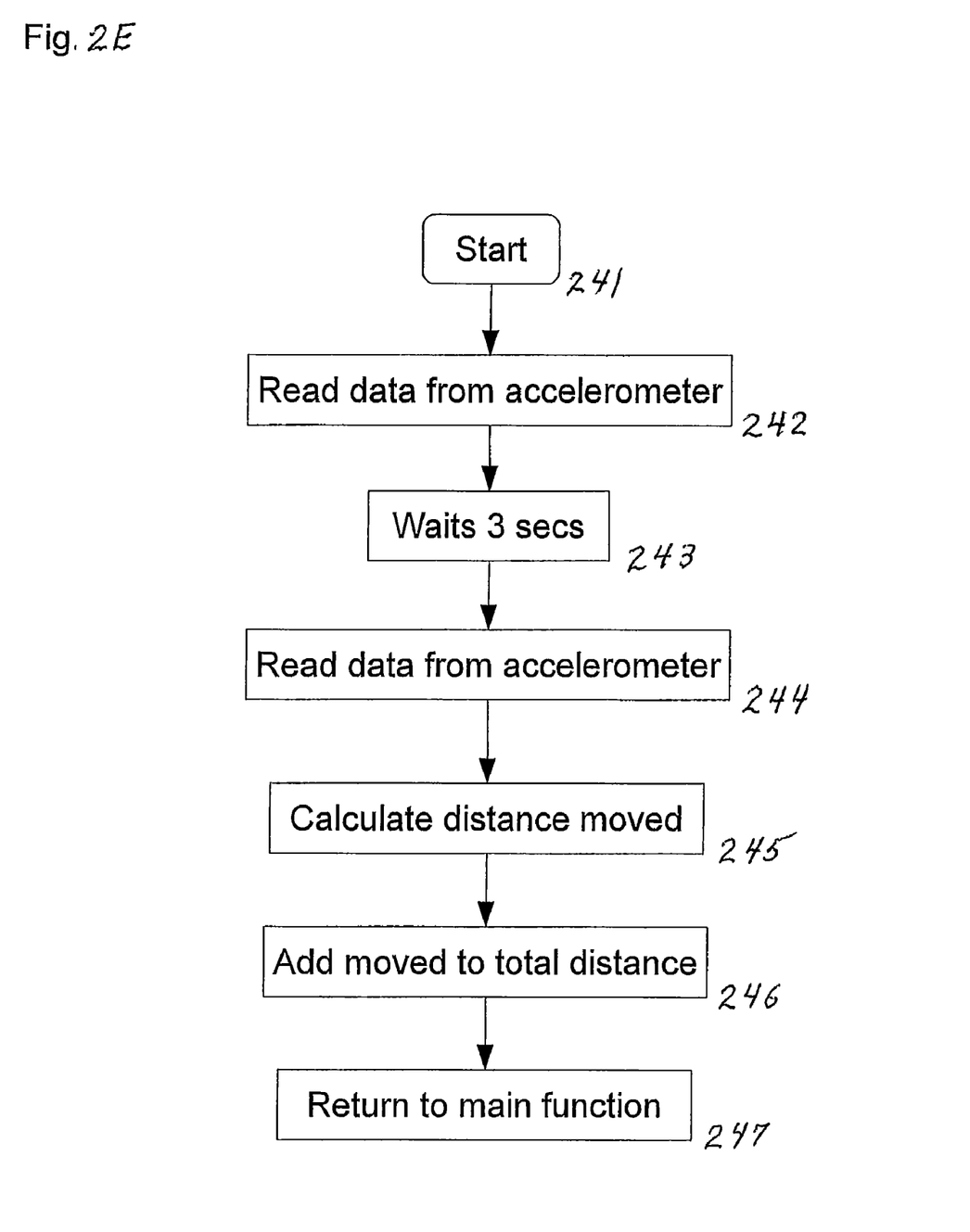

As explained above, if the random number is less than or equal to 399, the algorithm branches to the no movement routine. Referring now to FIG. 2E, illustrated is a flow chart of one embodiment of the no movement function logic employed to control the waterfowl decoy 100. Beginning at Start Step 241, the algorithm reads X and Y acceleration data from the accelerometer 150 at Step 242. At Step 243, the algorithm waits three seconds. At Step 244, the algorithm directs the microcontroller 140 to read the X and Y acceleration data from the accelerometer 150. At Step 245, the algorithm calculates the distance moved according to the dead reckoning equation. At Step 246, the algorithm adds any distance that the decoy may have moved to the then total distance. At Step 247, the algorithm returns to the Main Program at Step 204 and proceeds as above.

Figure 2F:
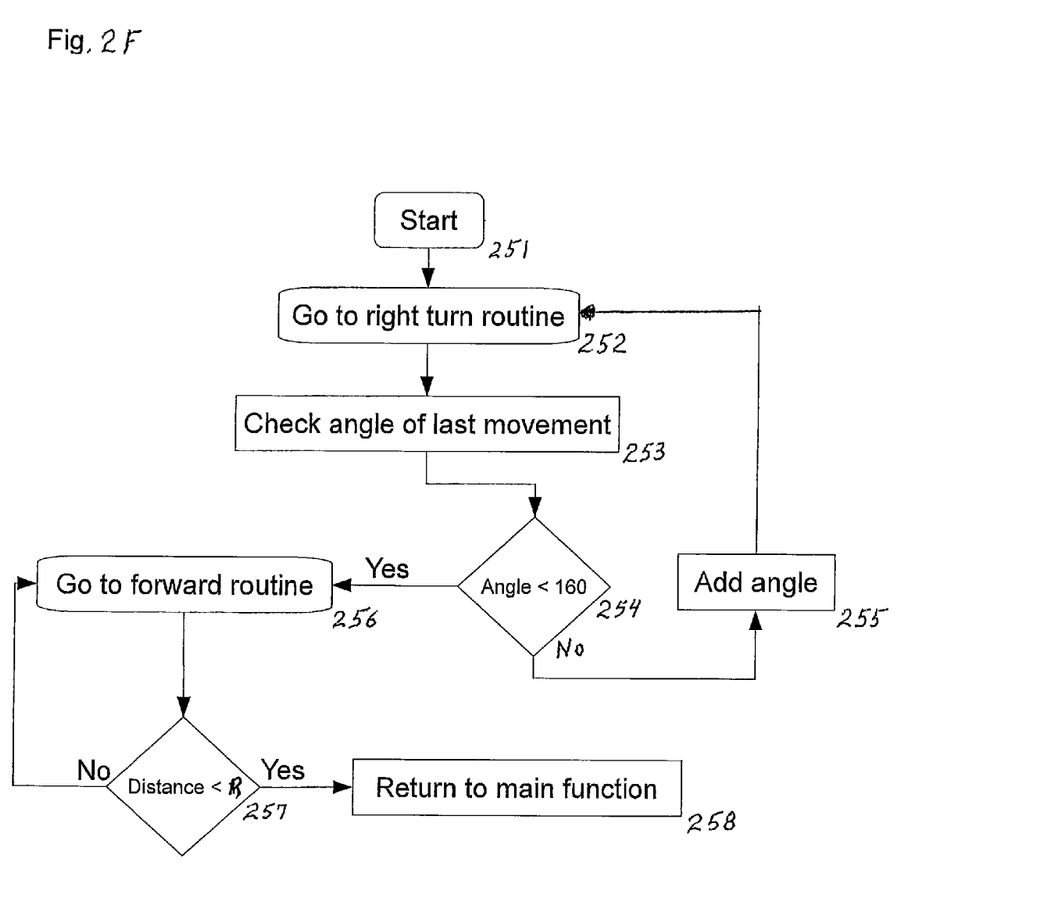

As specified above, if the distance value at Step 209 is greater than or equal to the range control setting R, the algorithm branches to the turn around routine. Referring now to FIG. 2F, illustrated is a flow chart of one embodiment of the turn around routine function logic employed to control the waterfowl decoy 100. Begin at Start Step 251. At Step 252, the algorithm goes to the Right Turn Routine of FIG. 2B and proceeds as above while collecting the magnitude of the angle of right turn. At Step 253, the algorithm reads the magnitude of the angle of last movement. At Step 254, the algorithm checks the angle of right turn against a value of 160 degrees. If the angle is more than 160 degrees, the algorithm proceeds to Step 255 which branches back to Step 252 for a further right turn. If the angle is less than 160 degrees, the algorithm branches to Step 256 and the straight movement routine of FIG. 2D. Upon completion of the straight movement routine and before returning to the Main Program, the total distance is checked against the preset range R at Step 257. If the total distance is less than the preset range R, the algorithm proceeds to Step 258 and returns to the Main Program at Step 204. If the total distance is more than the preset range R, the algorithm returns to Step 256 and the straight movement routine where the loop repeats until the total distance is less than the preset range R and the algorithm can return to the Main Program at Step 204.

Referring now to FIG. 3A, illustrated is a plan view of a second embodiment of a semi autonomous waterfowl decoy system 300. The waterfowl decoy system 300 comprises a base pole 310, a central control unit 320 and a plurality of waterfowl decoys 330. The base pole 310 comprises a plurality of decoy hooks 311, a like plurality of charging cords 312, a rechargeable battery pack 313, a microcontroller 314, a multi-position range switch 315, a transmitter 316, a hanger arm 317, an AC power receptacle 318, a DC power receptacle 319, and a radio frequency (RF) transmitter 323. The plurality of decoy hooks 311 may be formed as part of the base pole 310 for storing the plurality of waterfowl decoys 330. In a similar manner, the like plurality of charging cords 312 are coupled to the base pole 310 for charging batteries (not shown) within the plurality of waterfowl decoys 330. Removable AC and DC power cords 341, 342, respectively, are provided to power the recharging circuits associated with the rechargeable batteries of the decoys 330 and the central control unit 320.

As an alternative to the base pole 310, the system 300 may be configured with a base decoy (not shown) that contains the central control unit 320, rechargeable battery pack 313, microcontroller 314, multi-position range switch 315, transmitter 316, AC power receptacle 318, the DC power receptacle 319, and a radio frequency (RF) transmitter 323. Thus, the base decoy performs the same functions as the base pole 310 except for decoy storage and decoy charging. The base decoy would generally not have "swimming" capability, although it could be implemented with radio control technology as a way to recover the plurality of waterfowl decoys 330 by using the homing function to be described below.

Figure 3B:
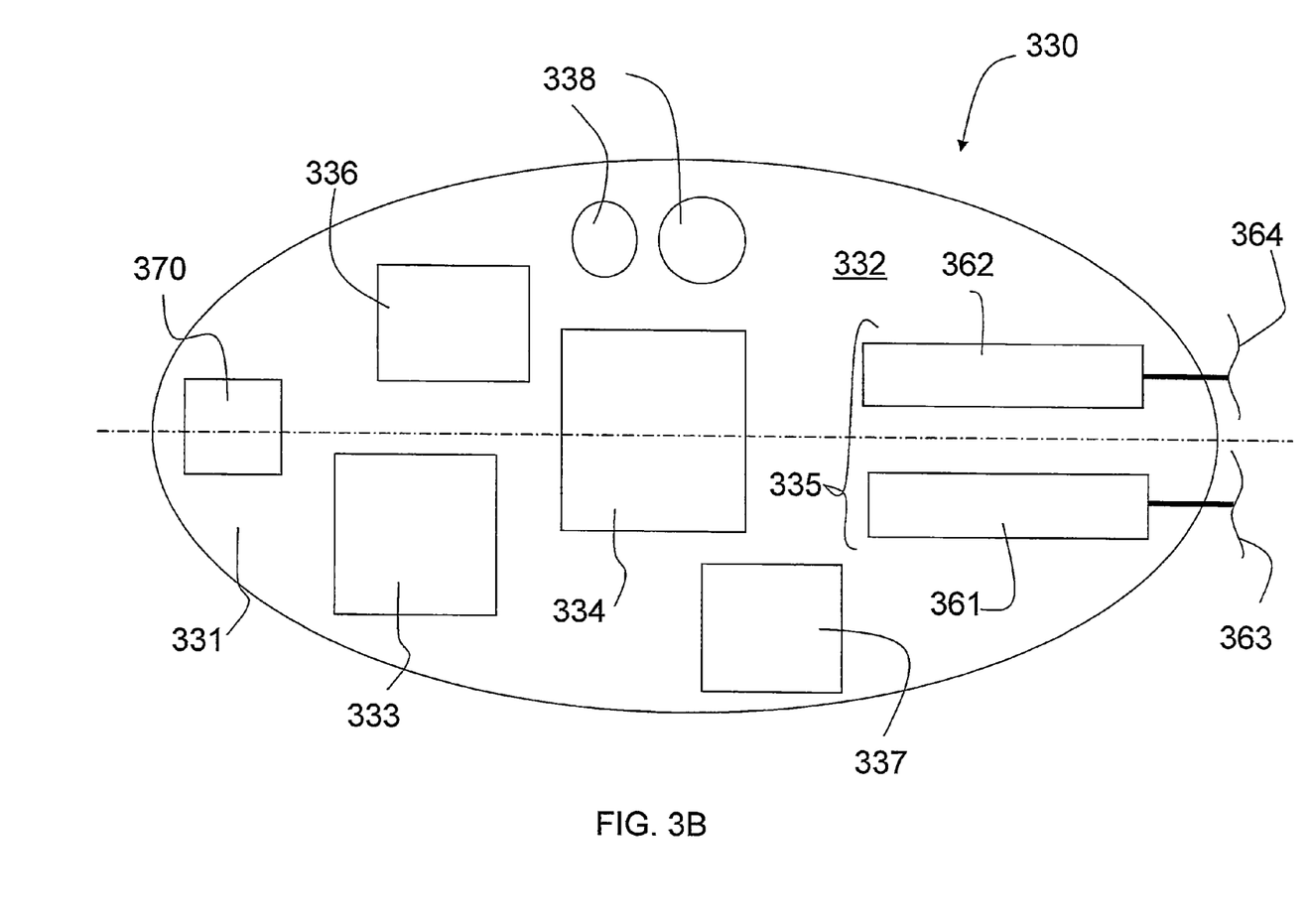

Referring now to FIG. 3B, illustrated is a plan view of a functional block diagram of the embodiment of a semiautonomous waterfowl decoy 330 of FIG. 3A. Each of the plurality of waterfowl decoys 330 is substantially the same as the waterfowl decoy 100 of FIG. 1 and comprises an inner cavity 331 having an equipment mounting surface 332 located therein, a microcontroller 333, a dual axis accelerometer 334, a propulsion system 335, first and second rechargeable battery packs 336, 337, respectively, and a power receptacle 338, and an RF receiver 370. This embodiment differs from the embodiment of FIG. 1 in that multi-position range switch 315 is located in a central control unit 320 coupled to the base pole 310 and not in the individual decoys 330. This embodiment operates in essentially the same manner as the embodiment of FIG. 1 except that the multi-position range switch 315 is set in the central control unit 320 and the range setting is transmitted to all of the deployed decoys by the RF transmitter 323. Therefore, the individual decoys 330 commence calculation in their microcontrollers 333 at Step 204 of the Main Program (See FIG. 2A). Remaining operation of the system is the same as described above.

Figure 4:
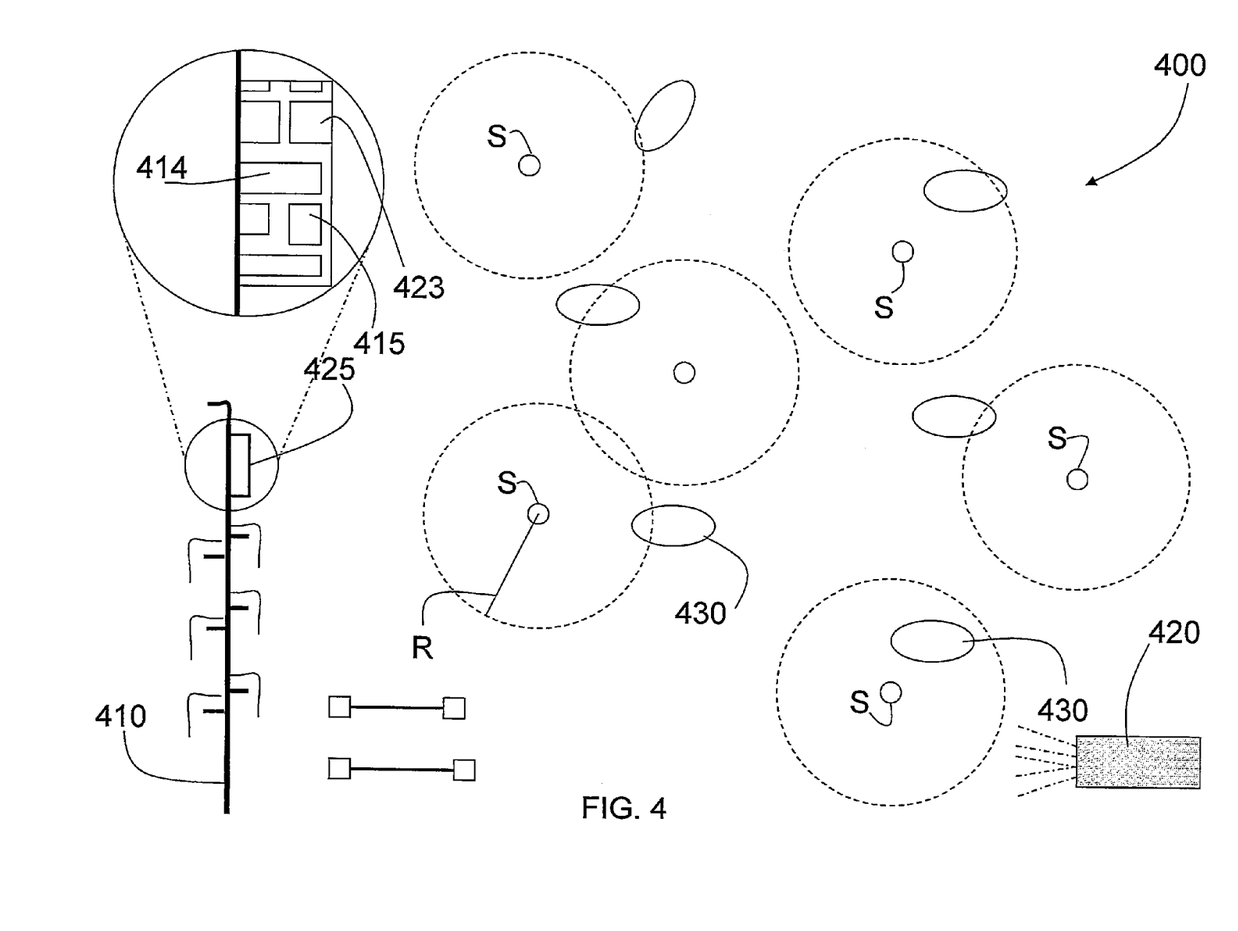
FIG. 4 illustrates an elevation view of a third embodiment of an autonomous waterfowl decoy system.

Referring now to FIG. 4, illustrated is an elevation view of a third embodiment of an autonomous waterfowl decoy system 400. The waterfowl decoy system 400 differs from the embodiment of FIG. 3 in that the decoy system 400 further comprises an RF receiver 415 and a hand-held remote control 420. The RF receiver 415 is located in a central control unit 425 similar to the central control unit 320 of FIG. 3A. The RF receiver 415 is configured to receive commands from the hand-held remote control 420. This embodiment provides considerably more flexibility in mimicking actual motion of the intended waterfowl species. This embodiment may be used to convey commands that affect all of the decoys 430 or only specific decoys. Commands that involve all of the decoys 430 may include, but are not limited to: setting one of the plurality of range settings for the waterfowl decoys 430, and commanding all of the waterfowl decoys 430 to return to the base pole 410. The command to return to the base pole 410, once issued to the decoys 430, may be implemented by incorporating a homing feature that homes on the transmitter 423 on the base pole 410. Once the decoys 430 have homed to the base pole 410, the remote control 420 may be used to turn the entire system 400 OFF except for the base pole RF receiver 415 which remains alert for a command from the hand-held remote control 420 to turn the system ON.

In one embodiment, the system 400 may comprise a variety of waterfowl decoys 430, each one of which has one or more different motions that mimic a motion of the intended waterfowl species. For example, one decoy may turn its head to the left or right on command. The command may be initiated by the operator/hunter inputting an attention command to the RF receiver 415 in the central control unit 425. This prepares the microcontroller to receive a specific numerical command associated with the desired decoy operation. For example, the attention command may be a separate button on the remote control 420, or it may be a two or three digit numerical command sent from the key pad of the remote control 420, e.g., "111" may alert the microcontroller to a command to follow. Turning a decoy head may have a command of "212". That command is then interpreted by the microcontroller 414 and a command is sent to all of the decoys 430 but it is only understood by the decoys 430 having a capability for head turning. The head turning mechanism may be implemented by a simple mechanical servo being operated by the decoy microcontroller. Other decoys may be constructed with a head dipping motion, such as for "drinking" or "feeding" by the decoy. In this case, the command may be "214" which is then retransmitted by the transmitter and only interpreted by the decoys 430 having the head dipping motion implemented therein. One who is of skill in the art will readily understand how this can be implemented in a decoy. Similarly, decoys may be constructed that extend the decoy wings and replicates a motion of the waterfowl drying its wings by "spinning" or other decoys may be implemented for opening and closing the decoy bill. While more mechanically involved, one who is of skill in the art may devise mechanisms to enable a decoy to simulate preening where the decoy head is placed under the wing as if cleaning the wing feathers. Furthermore, a decoy may be constructed that combines: (a) an upper body of the decoy 430 rising a moderate amount above a lower body that remains in the water to provide flotation and stabilize the decoy 430, and (b) a wing motion to simulate a waterfowl start of takeoff. The mechanisms to create these functions may be readily designed by one who is of ordinary skill in the art.

Although the present invention has been described in detail, those skilled in the art should understand that they can make various changes, substitutions and alterations herein without departing from the spirit and scope of the invention in its broadest form.

What is claimed is:

1. A waterfowl decoy system, comprising:
   a base unit having a range switch therein;
   a transmitter coupled to said base unit and configured to send a radio frequency signal associated with said range switch;
   a waterfowl decoy body having an inner cavity therein;
   a propulsion system mounted in said inner cavity and configured to propel said waterfowl decoy body across a surface of water;
   an accelerometer mounted in said inner cavity and configured to sense acceleration of said waterfowl decoy body when propelled across said surface of water;
   a decoy microcontroller coupled to said accelerometer and configured to calculate a distance traveled by said waterfowl decoy body when propelled across said surface of water; and
   a radio frequency receiver coupled to said decoy microcontroller and configured to receive said radio frequency signal, said radio frequency signal communicating a range setting to said decoy microcontroller.

2. The waterfowl decoy system as recited in claim 1 wherein said base unit is a base pole or a base decoy.

3. The waterfowl decoy system as recited in claim 2 further comprising a plurality of decoy hooks coupled to said base pole and configured to store an equal plurality of waterfowl decoy bodies.

4. The waterfowl decoy system as recited in claim 3 further comprising an equal plurality of charging cords coupled to said base pole for charging said plurality of waterfowl decoy bodies.

5. The waterfowl decoy system as recited in claim 1 further comprising a first rechargeable battery pack coupled to said base unit and said transmitter.

6. The waterfowl decoy system as recited in claim 5 further comprising AC and DC charging cords configured to couple between AC and DC power sources, respectively, and said base unit, said AC and DC charging cords configured to provide charging current to said first rechargeable battery pack.

7. The waterfowl decoy system as recited in claim 1, further comprising a rechargeable battery pack mounted in said inner cavity.

8. The waterfowl decoy system as recited in claim 7 further comprising AC and DC charging cords configured to couple between AC and DC power sources, respectively, and said base unit, said AC and DC charging cords configured to provide charging current to said second rechargeable battery pack.

9. The waterfowl decoy system as recited in claim 1 wherein said range switch is a multi-position range switch and wherein said radio frequency signal is different for each position of said multi-position range switch.

10. The waterfowl decoy system as recited in claim 1 wherein said radio frequency signal comprises a range setting signal or a homing signal.

11. The waterfowl decoy system as recited in claim 10 wherein said range setting signal is a pulse wave modulation signal.

12. The waterfowl decoy system as recited in claim 1 wherein said radio frequency receiver is a first radio frequency receiver and further comprising:
 a wireless remote control;
 a second radio frequency receiver coupled to said base unit, said second radio frequency receiver configured to receive commands from said wireless remote control; and
 a system microcontroller coupled to said second radio frequency receiver, said system microcontroller configured to control a plurality of operations of said waterfowl decoy system.

13. The waterfowl decoy system as recited in claim 12 wherein said plurality of operations includes at least two of:
 setting a selected one of a plurality of range settings defining an equal plurality of approximate distance limits said waterfowl decoy body may travel from a start position before said microcontroller commands a turn around of said waterfowl decoy body;
 turning said waterfowl decoy system on or off;
 commanding all of said waterfowl decoy bodies to return to said base unit;
 turning a head of at least one of said waterfowl decoy bodies;
 dipping said head of said at least one of said waterfowl decoy bodies;
 spinning a wing of said at least one of said waterfowl decoy bodies;
 preening said head under said wing of said at least one of said waterfowl decoy bodies;
 moving a decoy bill of said at least one of said waterfowl decoy bodies;
 raising an upper portion of said at least one of said waterfowl decoy bodies above a floatation portion of said at least one of said waterfowl decoy bodies; and
 simulating takeoff start of said at least one of said waterfowl decoy bodies.

14. A method of manufacturing a waterfowl decoy system, comprising:
 providing a base unit having a range switch therein;
 coupling a radio frequency transmitter to said base unit and configuring said transmitter to send a radio frequency signal associated with said range switch;
 providing a waterfowl decoy body having an inner cavity therein;
 mounting a propulsion system in said inner cavity and configuring said propulsion system to propel said waterfowl decoy body across a surface of water;
 mounting an accelerometer in said inner cavity and configuring said accelerometer to sense acceleration of said waterfowl decoy body when propelled across said surface of water;
 coupling a decoy microcontroller to said accelerometer and configuring said decoy microcontroller to calculate a distance traveled by said waterfowl decoy body when propelled across said surface of water; and
 coupling a radio frequency receiver to said decoy microcontroller;
 configuring said radio frequency receiver to receive said radio frequency signal; and
 configuring said radio frequency receiver to communicate a range setting to said decoy microcontroller.

15. The method as recited in claim 14 further comprising coupling a first rechargeable battery pack to said base unit and said radio frequency transmitter.

16. The method as recited in claim 14 further comprising coupling a rechargeable battery pack to each inner cavity.

17. The method as recited in claim 14 wherein said range switch is a multi-position range switch and wherein said radio frequency signal is different for each position of said multi-position range switch.

18. The method as recited in claim 14 wherein said radio frequency receiver is a first radio frequency receiver and further comprising:
 providing a wireless remote control; and
 coupling a second radio frequency receiver to said base unit and configuring said second radio frequency receiver to receive commands from said wireless remote control.

19. The method as recited in claim 18 further comprising:
 coupling a system microcontroller to said second radio frequency receiver; and
 configuring said system microcontroller to control a plurality of operations of said waterfowl decoy system.

20. The method as recited in claim 19 wherein said plurality of operations includes at least two of:
 setting a selected one of a plurality of range settings defining an equal plurality of approximate distance limits that each of said waterfowl decoy bodies may travel from a start position before said microcontroller commands a turn around of each of said waterfowl decoy bodies;
 turning said waterfowl decoy system on or off;
 commanding all of said waterfowl decoy bodies to return to said base unit;
 turning a head of at least one of said waterfowl decoy bodies;

dipping said head of said at least one of said waterfowl decoy bodies;

spinning a wing of said at least one of said waterfowl decoy bodies;

preening said head under said wing of said at least one of said waterfowl decoy bodies;

moving a decoy bill of said at least one of said waterfowl decoy bodies;

raising an upper portion of said at least one of said waterfowl decoy bodies above a floatation portion of said at least one of said waterfowl decoy bodies; and simulating takeoff start of said at least one of said waterfowl decoy bodies.

21. The method as recited in claim 14 wherein said first radio frequency transmitter is a pulse wave modulation transmitter.

22. The method as recited in claim 14 wherein said accelerometer is a dual-axis accelerometer.

* * * * *